US011845486B2

(12) United States Patent
Kremer et al.

(10) Patent No.: US 11,845,486 B2
(45) Date of Patent: Dec. 19, 2023

(54) STEERING COLUMN COVER AND STEERING COLUMN HAVING A STEERING COLUMN COVER

(71) Applicant: Bayerische Motoren Werke Aktiengesellschaft, Munich (DE)

(72) Inventors: Bernhard Kremer, Pliening (DE); Christian Voeller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 10 days.

(21) Appl. No.: 17/596,178

(22) PCT Filed: May 27, 2020

(86) PCT No.: PCT/EP2020/064715
§ 371 (c)(1),
(2) Date: Dec. 3, 2021

(87) PCT Pub. No.: WO2020/245001
PCT Pub. Date: Dec. 10, 2020

(65) Prior Publication Data
US 2022/0227410 A1    Jul. 21, 2022

(30) Foreign Application Priority Data

Jun. 4, 2019 (DE) ..................... 10 2019 114 991.6

(51) Int. Cl.
*B62D 1/185* (2006.01)
(52) U.S. Cl.
CPC ................... *B62D 1/185* (2013.01)

(58) Field of Classification Search
CPC ................. B62D 1/185; B62D 1/183
See application file for complete search history.

(56) References Cited

U.S. PATENT DOCUMENTS

| 5,737,971 | A | 4/1998 | Riefe et al. |
| 11,117,610 | B2 * | 9/2021 | Bayer ..................... F16D 3/065 |
| 2007/0296194 | A1 | 12/2007 | Ridgway et al. |
| 2010/0083787 | A1 | 4/2010 | Buchheit |
| 2014/0217691 | A1 | 8/2014 | Zeinar et al. |

(Continued)

FOREIGN PATENT DOCUMENTS

| CN | 103796902 A | 5/2014 |
| CN | 108349520 A | 7/2018 |

(Continued)

OTHER PUBLICATIONS

International Search Report (PCT/ISA/210) issued in PCT International Application No. PCT/EP2020/064715 dated Sep. 7, 2020 with English translation (four (4) pages).

(Continued)

*Primary Examiner* — Drew J Brown
(74) *Attorney, Agent, or Firm* — Crowell & Moring LLP

(57) ABSTRACT

A steering column cover of a steering column has steering column elements that can be moved relative to one another in the direction of the steering column axis. The steering column cover includes a plurality of casing elements, which surround the steering column, are arranged one behind the other in the axial direction, and telescopically engage in one another. The casing elements are coupled to one another by way of a gear mechanism.

11 Claims, 2 Drawing Sheets

(56) References Cited

U.S. PATENT DOCUMENTS

| | | |
|---|---|---|
| 2018/0297514 A1 | 10/2018 | Massonnaud et al. |
| 2018/0319419 A1 | 11/2018 | Kreutz et al. |
| 2019/0054948 A1 | 2/2019 | Ancelin et al. |

FOREIGN PATENT DOCUMENTS

| | | | | |
|---|---|---|---|---|
| CN | 109070930 A | | 12/2018 | |
| CN | 114954622 A | * | 8/2022 | ............ B62D 1/181 |
| CN | 115195846 A | * | 10/2022 | |
| DE | 196 44 170 A1 | | 4/1998 | |
| DE | 102004014506 A1 | * | 10/2005 | ............ B62D 1/185 |
| DE | 10 2015 224 602 A1 | | 6/2017 | |
| DE | 102019201621 A1 | * | 8/2020 | |
| DE | 102019004998 A1 | * | 5/2021 | |
| EP | 1 083 108 A2 | | 3/2001 | |
| EP | 3 083 368 B1 | | 5/2018 | |
| EP | 3617035 A1 | * | 3/2020 | ............ B62D 1/181 |
| FR | 2 880 858 A1 | | 7/2006 | |
| GB | 490959 A | | 8/1938 | |
| JP | 60-18449 A | | 1/1985 | |
| JP | 2008-126736 A | | 6/2008 | |
| KR | 20210101735 A | * | 8/2021 | |
| WO | WO-2021224199 A1 | * | 11/2021 | ............ B62D 1/185 |

OTHER PUBLICATIONS

German-language Written Opinion (PCT/ISA/237) issued in PCT International Application No. PCT/EP2020/064715 dated Sep. 7, 2020 (six (6) pages).

German-language Search Report issued in German Application No. 10 2019 114 991.6 dated Mar. 10, 2020 with partial English translation (10 pages).

English translation of Chinese language Office Action issued in Chinese Application No. 202080038093.0 dated Feb. 14, 2023 (six (6) pages).

* cited by examiner

STEERING COLUMN COVER AND STEERING COLUMN HAVING A STEERING COLUMN COVER

BACKGROUND AND SUMMARY OF THE INVENTION

The invention relates to a steering column cover. It furthermore relates to a steering column having such a steering column cover and to a motor vehicle having such a steering column.

The axial adjustability of the steering column of a motor vehicle by means of the steering shaft section emerging from the steering wheel is standard nowadays in order to be able to adapt the position of the steering wheel to the sitting position and the physical dimensions of the driver. The region of the steering column between the steering wheel and the dashboard, from which the steering column with the steering wheel protrudes, is covered with a steering column cover. In passenger vehicles, conventional steering column coverings cover an axial movement path of approximately 60 mm in the longitudinal direction of the steering column.

In the case of future, fully autonomous motor vehicles, the steering wheel is not required during the fully autonomous driving mode, and there is an endeavor, in these phases of the driving mode, to place the steering wheel against the dashboard or to position it in a corresponding recess in the dashboard so that the driver obtains greater freedom of movement. For this purpose, however, an axial movement path of the steering column is required which is significantly larger than in the case of currently provided steering column covers and which is, for example, 160 mm or more. The movement path has to be provided by a future steering column cover. In addition, however, the restricted installation space in the region of the dashboard also has to be taken into consideration.

GB 490 959 A discloses a motor vehicle steering wheel which is movable axially on a steering shaft, in which a volute spring which is wound around the steering shaft is provided between the steering shaft end of the steering wheel and a collar surrounding the steering shaft, the volute spring surrounding the free end of the steering shaft in the displacement region of the steering wheel and pretensioning the steering wheel into a maximally extended position.

EP 3 083 368 B1 discloses a steering column cover for tractors, which consists of a lower and an upper cup-like cover part. The lower cover part is connected to a dashboard-like section of the body and the upper cover part is connected to the steering wheel. The lower edge of the upper cover part overlaps the upper edge of the lower cover part, which edge merges into a radially extending, upper wall of the lower cover part, in which a seal engaging around the steering shaft is provided. During an axial adjustment of the steering wheel, the two cover parts which engage in each other enable a telescopic expansion or compression of the steering wheel cover. The axial length of the respective cover part determines the minimum extent and the maximum extent of the variable part of the steering column cover and therefore the usable movement path of the steering column, in which the steering column cover is effective.

It is an object of the present invention to provide a steering column covering which covers the region of the steering column between the steering wheel and the dashboard over a longer movement path even when installation conditions are restricted.

This object is achieved with the features of the independent claim.

A steering column cover of a steering column having steering column elements which are movable relative to one another in the direction of the steering column axis has a plurality of casing elements which surround the steering column, are arranged one behind another in the axial direction and engage telescopically in one another, wherein, according to the invention, the casing elements are coupled to one another by the gear mechanism.

The steering column cover according to the invention is provided with a plurality of, preferably at least three, tubular casing elements which have different outside diameters at least in regions and engage telescopically in one another and can thus be pushed into one another in order to move from a maximum length to a minimum position. The coupling of the casing elements to one another by means of the gear mechanism has the effect that, in the event of an axial compression and also in the event of an axial expansion of the steering column cover, the casing elements move synchronously relative to one another and therefore a defined axial displacement of the individual casing elements with respect to one another always takes place.

Further preferred and advantageous refinement features of the steering column cover according to the invention are the subject matter of the dependent claims.

A first casing element is preferably coupled to a first steering column element which is movable in the axial direction, for example the steering wheel. The steering column cover together with the axially movable steering column element is thereby moved in both axial directions and is thus inevitably driven by the drive of the movable steering column element. During compression of the steering column in the axial direction, the final casing element which is positioned away from the first casing element is supported on a steering column element which is rigid in the axial direction or on the dashboard or on another part of the vehicle structure, thus enabling the compression, which is synchronized by the gear mechanism, of the telescopic steering column covering to be initiated. It may be of advantage here if at least one further casing element, for example the final casing element, is coupled to a further steering column element, which is rigid in the axial direction, or to the dashboard or to another part of the vehicle structure. It can thereby be ensured that also in the event of an extension of the steering column, the telescopic steering column covering, synchronized by the gear mechanism, expands uniformly and, in the process, always covers the free end of the steering shaft in the movement range of the steering column.

In a first advantageous embodiment of the steering column cover according to the invention, the gear mechanism is a scissor mechanism.

In a second advantageous embodiment of the steering column cover according to the invention, the gear mechanism has racks and pinions meshing therewith.

In a particular preferred embodiment, the first, radially outer casing element has a rack, the row of teeth of which meshes with a pinion which is mounted rotatably on a second casing element, which is arranged radially inward from the first casing element, wherein the axis of rotation of the pinion is placed in a plane which extends at a right angle to the steering column axis, and wherein a third casing element is provided radially inward from the second casing element, the third casing element having a second rack, the row of teeth of which is in meshing engagement with the pinion of the second casing element. This rack and pinion drive which couples the individual casing elements to one another ensures that the individual casing elements of the steering column cover moves synchronously with respect to one another during an axial displacement movement of the steering column and always take up a defined position relative to one another.

It is of advantage here if the third casing element is provided with a further, third rack which has a further row of teeth which meshes with a further pinion which is mounted rotatably on a fourth casing element, which is arranged radially inward from the third casing element, of a further, radially inner pair of casing elements, wherein the axis of rotation of the further pinion is also placed in a plane which extends at a right angle to the steering column axis, and if the further, radially inner pair of casing elements has, radially inward from the fourth casing element, a fifth casing element which has a fourth rack, the row of teeth of which is in meshing engagement with the further pinion of the fourth casing element. This development of the steering column cover comprises two further casing elements which are likewise incorporated into the gear mechanism coupling of the casing elements which are already present, and which extend the possible displacement path of the steering column cover, and therefore of the steering column, for maintaining the advantages already described.

It is furthermore advantageous if radially within the further, radially inner pair of casing elements at least one further pair of casing elements is also provided which is configured analogously to the above-described configuration. By adding such further pairs of casing elements, which are coupled to one another by the rack and pinion drive arrangement, the displacement part of the steering column cover, and therefore the steering column, can be further increased while retaining the advantages mentioned.

Preferably, the length and/or the pitch of all the racks and the diameter and/or the pitch of all the pinions are identical, thus enabling a symmetrical relative displacement of all the casing elements with respect to one another to be achieved.

The invention is also directed toward a steering column having a steering column cover configured according to the invention. It is furthermore directed toward a motor vehicle having such a steering column.

Preferred exemplary embodiments of the invention with additional refinement details and further advantages are described and explained in more detail below with reference to the attached drawings.

DETAILED DESCRIPTION OF THE DRAWINGS

Figure 1:
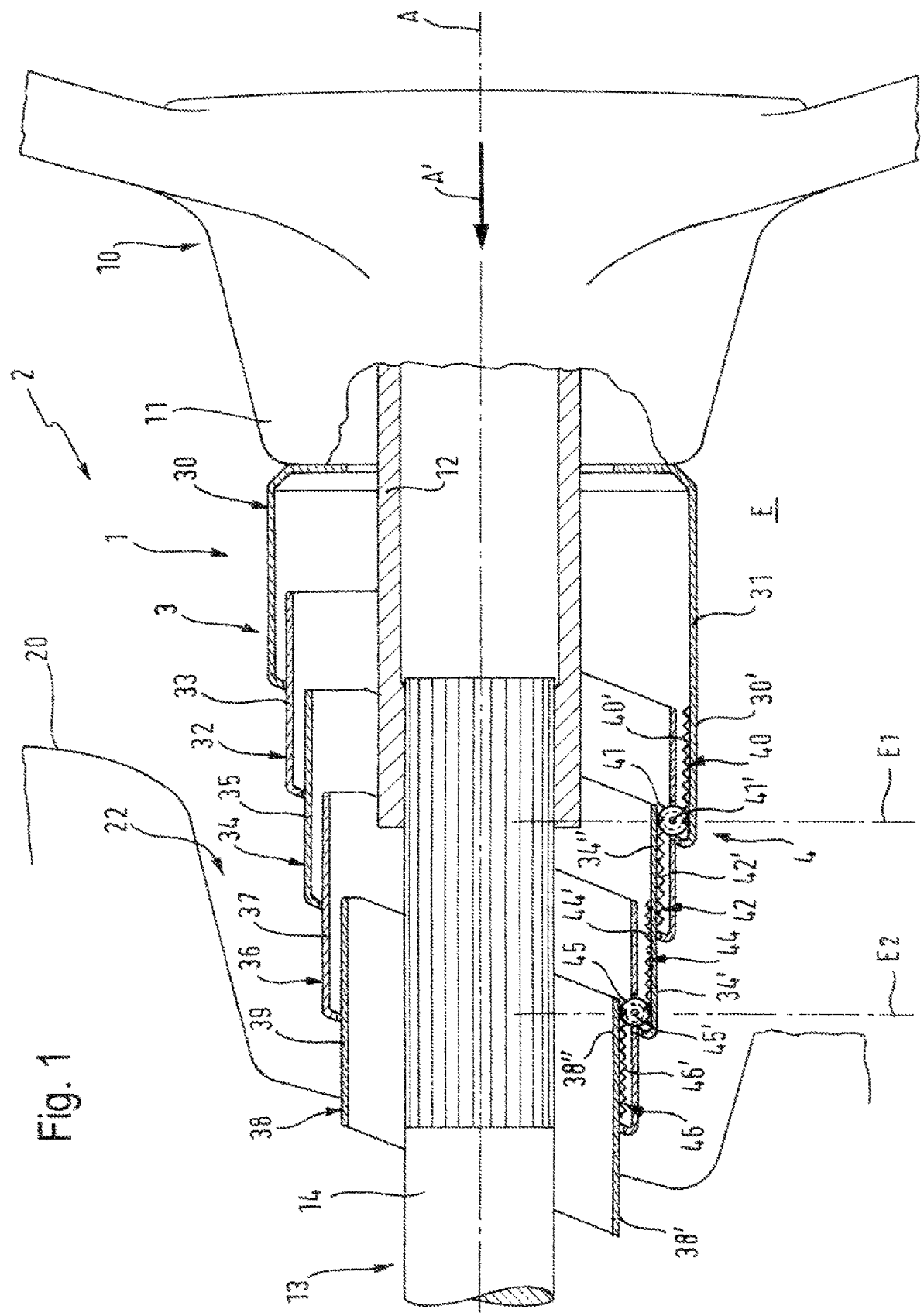
FIG. 1 shows an axially adjustable steering column with a first embodiment of a steering column covering according to the invention.

FIG. 1 shows the steering column 1 of a motor vehicle 2 in a partially sectioned illustration with a steering column cover 3. The steering column 1 has a steering wheel 10 and a tubular first steering column element 12, which is connected nonrotatably to the latter, and a second steering column element 14 which is formed by a part of a steering shaft 13 protruding from a dashboard 20 of the vehicle. The steering shaft is connected in a conventional manner to a steering gear of the vehicle steering system.

The two steering column elements 12, 14 are coupled to one another nonrotatably, but so as to be displaceable along the steering column axis A, wherein a locking mechanism, not illustrated in the drawing, is provided with which the two axially movable steering column elements 12, 14 can be fixed relative to one another in the axial direction. Such locking mechanisms for axially adjustable steering columns are conventionally known and configured, for example, as clamping mechanisms. The steering column element 30 which is connected to the steering wheel 10 can be displaced axially manually or by means of a motorized adjustment drive.

The two steering column elements 12, 14 are surrounded in their displacement range by the steering column cover 3 which extends between the steering wheel 10 and the dashboard 20. The steering column cover 3 consists of a plurality of casing elements 30, 32, 34, 36, 38 which surround the steering column 1 and are arranged one behind another in the axial direction and are substantially tubular, have diameters different from one another and engage telescopically in one another, as can be seen in FIG. 1. The casing elements 30, 32, 34, 36, 38 are arranged nonrotatably relative to one another and also nonrotatably relative to the steering wheel 10 or relative to the dashboard 20 such that the steering column cover 3 which is formed by them either rotates together with the steering wheel, or the steering wheel 10 is rotatable relative to the steering column cover 3.

The radially outer, first casing element 30 is coupled, at least in the axial direction, to that end section 11 of the steering wheel 10 which faces the dashboard, that is to say that axial displacement movements of the steering wheel 10 along the steering wheel axis A are transmitted from the steering wheel 10 to the first casing element 30. The final, radially innermost casing element 38 is coupled in an axially fixed manner to the dashboard 20. In the example shown in FIG. 1, five casing elements are provided, but the invention is not restricted to this number of casing elements. It is possible also to provide more or fewer casing elements, with them preferably forming an uneven number.

The casing elements 30, 32, 34, 36, 38 are coupled to one another by a gear mechanism 4. In the example shown in FIG. 1, the gear mechanism 4 is configured as a rack and pinion drive and has racks 40, 42, 44, 46 and pinions 41, 45.

On the radially inner side of its wall 31 in the region of its front end 30' facing the dashboard 20, the first, radially outer casing element 30 on the steering wheel side has a first rack 40 which runs parallel to the steering wheel axis A and the row of teeth 40' of which meshes with a pinion 41 which is mounted rotatably in or on the wall 33 of the second casing element 32, which is arranged radially inward from the first casing element 30. The axis of rotation 41' of this first pinion 41 lies in a first plane $E_1$ which extends at a right angle to the steering column axis A.

The third casing element 34 is provided radially inward from the second casing element 32, the third casing element being provided, at its rear end section 34" facing the steering wheel 10 on the radially outer side of its wall 35, with a second rack 42 of the gear mechanism 4, the row of teeth 42' of which rack faces radially outward and likewise runs parallel to the steering column axis A. The second rack 42 is positioned in the same plane E in which the first rack 40 lies and in which the first pinion 41 extends; this plane E corresponds to the plane of the drawing in FIG. 1. The second rack 42 is likewise in meshing engagement with the first pinion 41 of the second casing element 32.

On the radially inner side of the wall 35 of the third casing element 34, in the front end section 34' facing the dashboard 20, a further, third rack 44 is provided, the (further) row of teeth 44' of which extends parallel to the steering column axis A and preferably likewise in the plane E. The third rack 44 for its part is again in meshing engagement with a second pinion 45 of the gear mechanism 4. The second pinion 45 is mounted rotatably in or on the wall 37 of the fourth casing element 36 arranged radially inward from the third casing element 34. The axis of rotation 45' of the second pinion 45 lies in a second plane $E_2$ which likewise extends at a right angle to the steering column axis A and therefore parallel to the first plane $E_1$.

Radially inward from the fourth casing element 36, the fifth casing element 38 (the final one in the example of FIG. 1) is provided which, on the radially outer side of its wall 39 on the rear end section 38" thereof facing the steering wheel, is provided with a fourth rack 46 of the gear mechanism 4, the row of teeth 46' of which faces radially outward and likewise runs parallel to the steering column axis A. The fourth rack 46 is positioned in the same plane E in which the other racks 40, 42, 44 are also located and in which the pinions 41 and 45 of the gear mechanism 4 extend. The front end section 38' of the fifth casing element 38 that faces away from the steering wheel 10 is coupled fixedly in the axial direction to the dashboard 20, as has already been explained.

In the region in which the steering column 1 emerges from the dashboard 20, the dashboard 20 has a trough-like depression 22 in which the steering column 1 can be accommodated in the pushed-together state (in the direction of the arrow A' in FIG. 1). In the pushed-together state, the steering wheel 10 lies directly against the dashboard 20 or is itself recessed in a corresponding recess of the dashboard such that the steering wheel 10 does not protrude into the passenger compartment during a fully autonomous driving mode. FIG. 1 shows the extended state of the steering column 1.

An axial movement of the steering wheel 10 in the direction of the arrow A' has the effect that the individual casing elements 30, 32, 34, 36, 38 of the steering column cover 3 are pushed telescopically into one another, wherein the intermeshing racks and pinions of the gear mechanism 4 synchronize this telescopic movement such that a uniform distance of the individual casing elements 30, 32, 34, 36, 38 with respect to one another in the axial direction is always obtained irrespective of the axial position of the steering wheel 10. In a corresponding manner, the racks and pinions of the gear mechanism 4 synchronize the telescopic movement of the casing elements 30, 32, 34, 36, 38 also when the steering wheel 10 is being pulled out of the dashboard 20 counter to the direction of the arrow A'.

Figure 2:
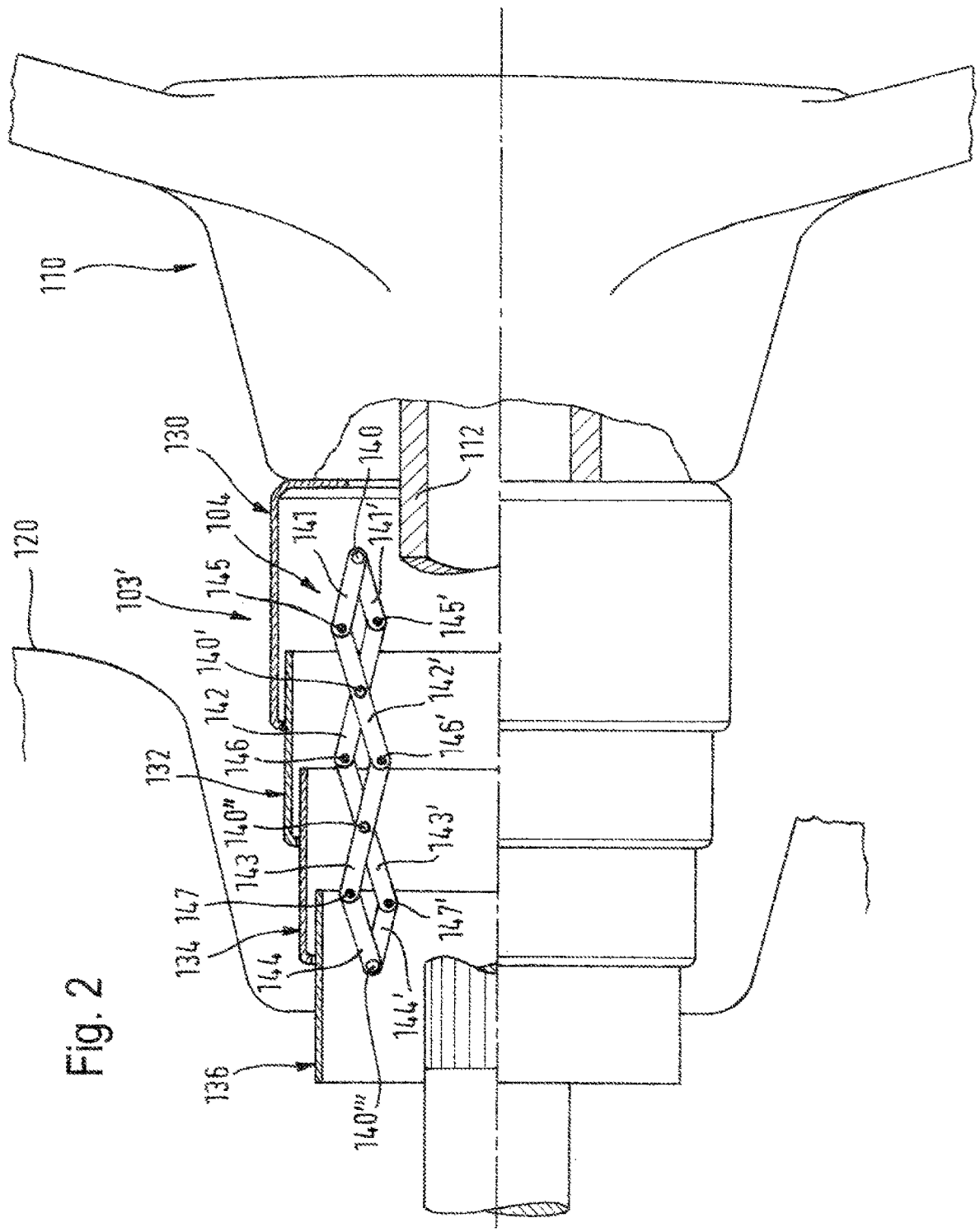
FIG. 2 shows an axially adjustable steering column with a second, alternative embodiment of the steering column covering according to the invention.

FIG. 2 shows an alternative embodiment of the steering column cover 103, in which the gear mechanism 104 is formed by a scissor mechanism; otherwise, this alternative embodiment of the steering column cover is constructed in the same manner as the embodiment from FIG. 1, but wherein here preferably an even number of casing elements is provided, as is also illustrated in FIG. 2. According thereto, the dashboard-side fourth casing element 136 is coupled in the axial direction to the dashboard 120. The first casing element 130 which faces away from the dashboard 120 is coupled in the axial direction to the steering wheel 110 or to a first steering column element 112 on the steering wheel side. The respective central joint connectors 140, 140', 140", 140' of the individual scissor elements 141, 141', 142, 142', 143, 143', 144, 144' are connected to a respective casing element 130, 132, 134, 136 and the respective outer joint connectors 145, 145', 146, 146', 147, 147' are decoupled from the casing elements 130, 132, 134, 136. The scissor mechanism synchronizes the relative movements of the casing elements 130, 132, 134, 136 with respect to one another such that it is also ensured in this embodiment that the casing elements 130, 132, 134, 136 can move telescopically in synchronism.

The invention is not restricted to the above exemplary embodiment which serves merely to provide a general explanation of the core concept of the invention. Rather, within the scope of protection, the apparatus according to the invention can also take on configurations other than those described above. In particular, the apparatus here can have features which constitute a combination of the respective individual features of the claims.

Reference signs in the claims, the description and the drawings serve merely to provide a better understanding of the invention and are not intended to limit the scope of protection.

LIST OF REFERENCE SIGNS

1 Steering column
2 Motor vehicle
3 Steering column cover
4 Gear mechanism
5 Scissor mechanism
10 Steering wheel
11 End section of the steering wheel
12 Steering column element
13 Steering shaft
14 Steering column element
20 Dashboard
22 Trough-like depression
30 Casing element
30' Front end of 30
31 Wall of 30
32 Casing element
33 Wall of 32
34 Casing element
34' Front end section of 34
34" Rear end section of 34
35 Wall of 34
36 Casing element
37 Wall of 36
38 Casing element
38' Front end section of 38
38" Rear end section of 38
39 Wall of 38
40 Rack
40' Row of teeth
41 Pinion
41' Axis of rotation
42 Rack
42' Row of teeth
44 Rack
44' Row of teeth
45 Pinion
45' Axis of rotation
46 Rack
46' Row of teeth
103 Steering column cover
104 Gear mechanism
110 Steering wheel
112 Steering column element
120 Dashboard
130 First casing element
132 Second casing element
134 Third casing element
136 Fourth casing element
140 Joint connector 140' Joint connector
140" Joint connector
140'" Joint connector
141 Scissor element
141' Scissor element
142 Scissor element
142' Scissor element
143 Scissor element
143' Scissor element
144 Scissor element
144' Scissor element
145 Outer joint connector
145' Outer joint connector
146 Outer joint connector
146' Outer joint connector
147 Outer joint connector
147' Outer joint connector
A Steering column axis
A' Arrow
E Plane
E1 First plane
E2 Second plane

What is claimed is:

1. A steering column cover of a steering column which is provided with a steering wheel and has steering column elements which are movable relative to one another in the direction of a steering column axis manually or by way of a motorized actuator, the steering column cover comprising:
a plurality of casing elements which surround the steering column, are arranged one behind another in an axial direction and engage telescopically in one another and are displaceable in one another in the axial direction; and
a gear mechanism by which at least three casing elements are coupled to one another for relative displacement in the axial direction as a result of an axial movement of the steering wheel,
wherein the casing elements are arranged nonrotatably relative to one another, and
the gear mechanism is a scissor mechanism arranged within a hollow portion of the casing elements.

2. The steering column cover according to claim 1, wherein
a first casing element is coupled to a first steering column element which is movable in the axial direction.

3. A steering column comprising a steering column cover according to claim 1.

4. A motor vehicle comprising a steering column according to claim 3.

5. A motor vehicle comprising a steering column according to claim 3.

6. A steering column cover of a steering column which is provided with a steering wheel and has steering column elements which are movable relative to one another in the direction of a steering column axis manually or by way of a motorized actuator, the steering column cover comprising:
a plurality of casing elements which surround the steering column, are arranged one behind another in an axial direction and engage telescopically in one another and are displaceable in one another in the axial direction; and
a gear mechanism by which at least three casing elements are coupled to one another for relative displacement in the axial direction as a result of an axial movement of the steering wheel,
wherein the gear mechanism has racks and pinions meshing therewith,
the casing elements are arranged nonrotatably relative to one another,
the first, radially outer casing element has a rack, a row of teeth of which meshes with a pinion which is mounted rotatably on a second casing element, which is arranged radially inward from the first casing element, wherein an axis of rotation of the pinion is placed in a plane which extends at a right angle to the steering column axis, and
a third casing element is provided radially inward from the second casing element, the third casing element having a second rack, the row of teeth of which is in meshing engagement with the pinion of the second casing element.

7. The steering column cover according to claim 6, wherein
the third casing element is provided with a further rack which has a further row of teeth which meshes with a further pinion which is mounted rotatably on a fourth casing element, which is arranged radially inward from the third casing element, of a further, radially inner pair of casing elements, wherein the axis of rotation of the further pinion is also placed in a plane which extends at a right angle to the steering column axis, and
the further, radially inner pair of casing elements has, radially inward from the fourth casing element, a fifth casing element which has a fourth rack, the row of teeth of which is in meshing engagement with the further pinion of the fourth casing element.

8. The steering column cover according to claim 7, wherein
radially within the further, radially inner pair of casing elements, at least one further pair of casing elements is also provided.

9. The steering column cover according to claim 6, wherein
a length and/or a pitch of all the racks is identical, and
a diameter and/or a pitch of all the pinions is identical.

10. A steering column comprising a steering column cover according to claim 6.

11. The steering column cover according to claim 6, wherein
a first casing element is coupled to a first steering column element which is movable in the axial direction.

* * * * *